United States Patent Office 3,069,454
Patented Dec. 18, 1962

3,069,454
VINYLBORON COMPOUNDS AND METHOD FOR PREPARING SAME
George W. Willcockson, Anaheim, Don L. Hunter, Long Beach, and Irving S. Bengelsdorf, Costa Mesa, Calif., assignors to United States Borax & Chemical Corporation, Los Angeles, Calif., a corporation of Nevada
No Drawing. Filed May 2, 1961, Ser. No. 107,018
6 Claims. (Cl. 260—462)

The present invention relates as indicated to vinylboron compounds and to a method for preparing the same.

It is, therefore, the principal object of this invention to provide as new compounds dialkanolamine vinylboronates.

It is a further object of this invention to provide a method for preparing dialkanolamine vinylboronates.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative however, of but a few of the various ways in which the principle of the invention may be employed.

Broadly stated, the present invention comprises vinylboron compounds having the formula:

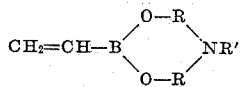

where R is an alkylene radical selected from the group consisting of ethylene and methylethylene radicals and R' is a material selected from the group consisting of hydrogen and alkyl radicals of from 1 to 20 carbon atoms.

The present dialkanolamine vinylboronates exhibit a remarkable stability to hydrolysis and oxidation, are easy to handle and can be stored at normal ambient temperature conditions for extended periods of time with no decomposition. These compounds have many applications in organic synthesis, such as, for example, in Diels-Alder reactions. These materials have also been found to have additional utility as germicides, fungicides, insecticides and herbicides.

The present dialkanolamine vinylboronates always have the vinyl group bonded directly to the boron atom, and are prepared either by the esterification of vinylboronic acid or by the transesterification of a dialkyl vinylboronate with a dialkanolamine. These reactions can best be illustrated by the following equation:

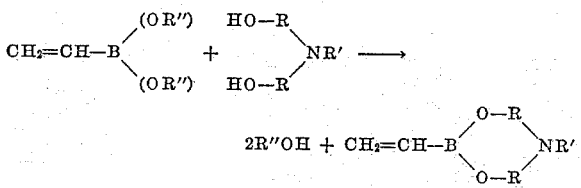

where R and R' are as described in the foregoing broadly stated paragraph, and R'' is either hydrogen or an alkyl radical of from 1 to 6 carbon atoms.

The foregoing reactions can be performed with the reactants acting as their own reaction media. However, we have found that in many instances, such as when esterifying vinylboronic acid with a dialkanolamine, the separation of the reaction products is facilitated and the yields are increased when the reaction is performed in the presence of a hydrocarbon solvent. In the preferred embodiment of the invention we, therefore, perform the reactions in the presence of a hydrocarbon solvent and remove the alcohol or water produced as an azeotrope with the hydrocarbon solvent. The most common hydrocarbon solvents such as benzene, toluene, n-heptane and xylene, as well as many other hydrocarbon solvents of this type are equally applicable for this use in the present invention.

Thus, the preferred method for preparing the dialkanolamine vinylboronates comprises admixing vinylboronic acid or a dialkyl vinylboronate with a dialkanolamine, under an inert atmosphere, in a hydrocarbon solvent. The agitated reaction mixture is then heated to reflux where the reaction proceeds to completion quite rapidly and the water or alcohol produced is removed as an azeotrope by distillation. The dialkanolamine vinylboronate is then separated from the remaining reaction mass by any of the well known separation techniques such as crystallization, sublimation or distillation, and is recovered in a substantially pure state.

As shown previously the vinylboronate reactants which are applicable to the present invention have the formula:

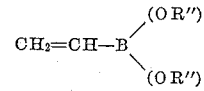

where R'' is either hydrogen or an alkyl radical of from 1 to 6 carbon atoms. The following are examples of such compounds:

vinylboronic acid
dimethyl vinylboronate
diethyl vinylboronate
diisopropyl vinylboronate
di-n-butyl vinylboronate
di-n-hexyl vinylboronate The following list is illustrative of the dialkanolamines which are applicable to the present invention:

diethanolamine
N-methyl-diethanolamine
diisopropanolamine
N-isopropyl-diethanolamine
N-t-butyl-diethanolamine
N-n-amyl-diisopropanolamine
N-n-octadecyl-disthanolamine It is to be clearly understood that the foregoing lists are only a partial enumeration of the re-actants which are applicable to the present invention and are in no way intended to limit the invention.

So that the present invention can be more clearly understood the following examples are given for illustrative purposes:

I

In a 300 ml., three-necked flask, equipped with a reflux condenser, a Dean-Stark water trap, and magnetic stirrer, were placed 13 grams (0.18 mole) of vinylboronic acid, 23.6 grams (0.22 mole) of diethanolamine and 175 ml. of benzene. The reaction mixture was then stirred and heated to reflux under a nitrogen atmosphere. After the theoretical amount of water, 6.5 ml., was removed the residual liquid was allowed to cool, and on cooling it separated into two liquid layers and a solid reaction product. Decolorizing carbon was added, the mixture was heated to reflux and filtered and on cooling colorless needles of diethanolamine vinylboronate, 17.8 grams (70.4% yield) crystallized and were recovered from the filtrate. Chemical analysis of the product yielded the following data:

Calculated for $C_6H_{12}BNO_2$: B=7.68%, N=9.94%, C=51.13%, H=8.52%.

Found in product: B=7.46%, N=10.10%, C=51.11%, H=8.90%.

II

In a 300 ml., three-necked flask, equipped with a reflux condenser, magnetic stirrer and a nitrogen by-pass were placed 13.7 grams (0.137 mole) of dimethyl vinylboronate and 16.33 grams (0.137 mole) of N-methyl-diethanolamine. The reaction mixture was then stirred and heated to reflux under a nitrogen atmosphere, and the theoretical amount of methanol, 8.8 grams, was removed by distillation. The remaining liquid was then fractionally distilled to yield a colorless liquid which on cooling to room temperature formed colorless crystals of N-methyl-diethanolamine vinylboronate, 9.1 grams, (43% yield). Chemical analysis of the product yielded the following data:

Calculated for $C_7H_{14}BNO_2$: B=6.99%, N=9.04%, C=54.26%, H=9.04%.
Found in product: B=7.03%, N=8.83%, C=54.21%, H=9.66%.

III

In a 300-ml., three-necked flask, equipped with a reflux condenser, magnetic stirrer and a nitrogen by-pass, were placed 18.4 grams (0.10 mole) of di-n-butyl vinylboronate, 11.9 grams (0.10 mole) of N-methyl-diethanolamine and 50 ml. of toluene. The reaction mixture was then stirred and heated to reflux under a nitrogen atmosphere. After the theoretical amount of n-butanol, 14.8 grams, was removed, the excess toluene was removed from the residual reaction mass by distillation. The remaining liquid was then fractionally distilled to yield a colorless liquid which on cooling to room temperature formed colorless crystals of N-methyl-diethanolamine vinylboronate, 12.4 grams (79.7% yield). Chemical analysis of the product yielded the following data:

Calculated for $C_7H_{14}BNO_2$: B=6.99%, N=9.04%, C=54.26%, H=9.04%.
Found in product: B=6.76%, N=8.85%, C=54.23%, H=9.79%.

IV

In a 300 ml., three-necked flask, equipped with a reflux condenser, magnetic stirrer and a nitrogen by-pass, were placed 27.6 grams (0.15 mole) of di-n-butyl vinylboronate, 35.6 grams (0.15 mole) of N-methyl-diisopropanolamine and 80 ml. of toluene. The reaction mass was then stirred and heated to reflux under a nitrogen atmosphere. After the theoretical amount of n-butanol, 22.2 grams, was removed, the excess toluene was removed from the residual reaction mass by distillation. The remaining liquid was then fractionally distilled to yield a colorless liquid which on cooling formed colorless crystals of N-methyl-diisopropanolamine vinylboronate, 32.1 grams (78.5% yield). Chemical analysis of the product yielded the following data:

Calculated for $C_9H_{18}BNO_2$: B=5.93%, N=7.66%, C=59.2%, H=9.84%.
Found in product: B=5.87%, N=7.49%, C=58.9%, H=10.1%.

Other modes of applying the principle of the invention may be employed, change being made as regards the details described, provided the features stated in any of the following claims or the equivalent of such be employed.

We, therefore, particularly point out and distinctly claim as our invention:

1. Vinylboron compounds having the formula

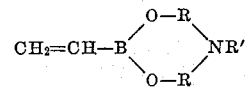

where R is an alkylene radical selected from the group consisting of ethylene and methylethylene radicals and R' is a material selected from the group consisting of hydrogen and alkyl radicals of from 1 to 20 carbon atoms.

2. Diethanolamine vinylboronate.
3. N-methyl-diethanolamine vinylboronate.
4. N-methyl-diisopropanolamine vinylboronate.
5. The method for preparing vinylboron compounds having the formula:

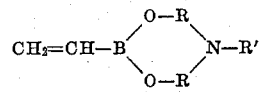

which comprises reacting under reflux, in an inert atmosphere a dialkanolamine having the formula:

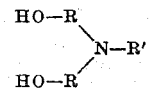

and a vinylboron compound having the formula:

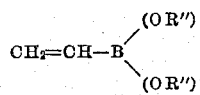

and recovering from the resultant reaction mass substantially pure dialkanolamine vinylboronate, wherein R is an alkylene radical selected from the group consisting of ethylene and methylethylene, R' is selected from the group consisting of hydrogen and alkyl radicals of from 1 to 20 carbon atoms, and R" is selected from the group consisting of hydrogen and alkyl radicals of from 1 to 6 carbon atoms.

6. The method for preparing vinylboron compounds having the formula:

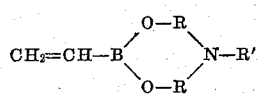

which comprises reacting under reflux, in the presence of a hydrocarbon solvent, in an inert atmosphere a dialkanolamine having the formula:

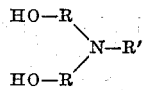

and a vinylboron compound having the formula:

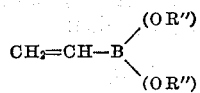

and recovering from the resultant reaction mass substantially pure dialkanolamine vinylboronate, wherein R is an alkylene radical selected from the group consisting of ethylene and methylethylene, R' is selected from the group consisting of hydrogen and alkyl radicals of from 1 to 20 carbon atoms, and R" is selected from the group consisting of hydrogen and alkyl radicals of from 1 to 6 carbon atoms.

No references cited.